United States Patent [19]
Inoue et al.

[11] Patent Number: 5,606,471
[45] Date of Patent: Feb. 25, 1997

[54] MAGNETIC TAPE CARTRIDGE DRIVER

[75] Inventors: Yukihiro Inoue, Matsuyama; Toshiharu Tsubouchi, Onson-gun, both of Japan

[73] Assignee: Matsushita Electric Industrial Co., Ltd., Osaka, Japan

[21] Appl. No.: 593,556

[22] Filed: Jan. 30, 1996

[30] Foreign Application Priority Data

Aug. 3, 1995 [JP] Japan .................................. 7-198557

[51] Int. Cl.⁶ .................................................. G11B 15/675
[52] U.S. Cl. ................................................. 360/96.5; 360/94
[58] Field of Search .................. 360/96.1, 96.5, 360/94, 93, 132, 99.02, 99.06; 369/77.2

[56] References Cited

U.S. PATENT DOCUMENTS

| | | | |
|---|---|---|---|
| 4,872,076 | 10/1989 | Uehara et al. | 360/99.07 |
| 5,025,334 | 6/1991 | Perana et al. | 360/96.5 |
| 5,109,308 | 4/1992 | Kukreja et al. | 360/96.5 |
| 5,315,462 | 5/1994 | Ohkubo et al. | 360/96.5 |
| 5,323,371 | 6/1994 | Nagase et al. | 369/77.2 |
| 5,371,639 | 12/1994 | Bryer | 360/96.5 |
| 5,430,588 | 7/1995 | Rasmussen | 360/96.5 |
| 5,448,432 | 9/1995 | Saga et al. | 360/96.5 |
| 5,485,326 | 1/1996 | Chiou et al. | 360/96.5 |
| 5,543,993 | 8/1996 | Argumendo et al. | 360/96.5 |

FOREIGN PATENT DOCUMENTS

| | | | |
|---|---|---|---|
| 4231574 | 4/1993 | Germany | 360/96.5 |
| 20252164 | 10/1990 | Japan | 360/96.5 |
| 3-49639 | 5/1991 | Japan | |
| 40149848 | 5/1992 | Japan | 360/96.5 |

*Primary Examiner*—Stuart S. Levy
*Assistant Examiner*—Paul J. Ditmyer
*Attorney, Agent, or Firm*—McDermott, Will & Emery

[57] ABSTRACT

The present invention provides a magnetic tape cartridge driver for opening a tape protecting door of a tape cartridge, enabling contact between a magnetic head of the magnetic tape cartridge driver and a magnetic tape housed within the tape cartridge, which can accept not only a conventional tape cartridge but also an enlarged tape cartridge containing a larger capacity, by providing a slider mounted in the cartridge tape driver for engaging with a guide groove formed on a side of an inserted tape cartridge, thereby sliding the tape cartridge along the guide rails to the specified position, where the slider tip comes into contact with an edge of the tape protecting door before the engagement of the guide rails with the guide grooves.

3 Claims, 6 Drawing Sheets

MAGNETIC TAPE CARTRIDGE DRIVER

BACKGROUND OF THE INVENTION

The present invention relates to a magnetic tape cartridge driver having a magnetic head insertable into an opening of a tape cartridge, wherein the tape cartridge has a door for closing the opening to protect the magnetic tape in modes other than record and playback. More specifically, the present invention relates to a magnetic tape cartridge driver which accommodates several different sizes of tape cartridges.

Figure 5A:
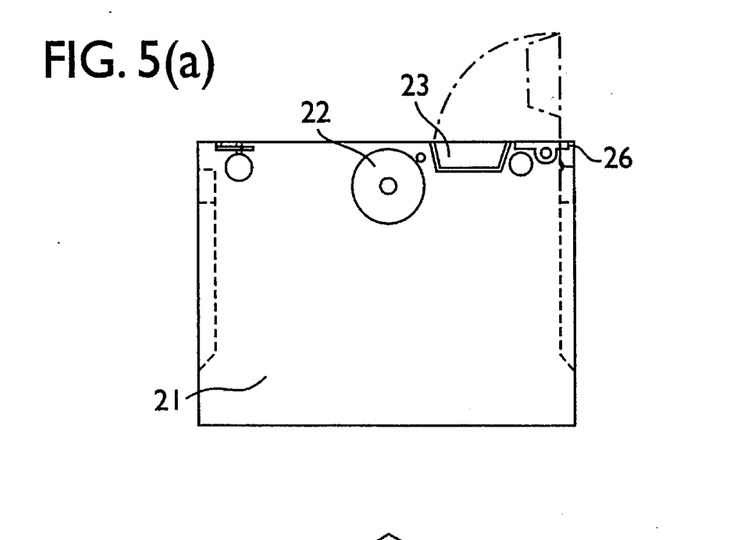
FIG. 5(a) is a top view of a conventional tape cartridge.
Figure 5B:
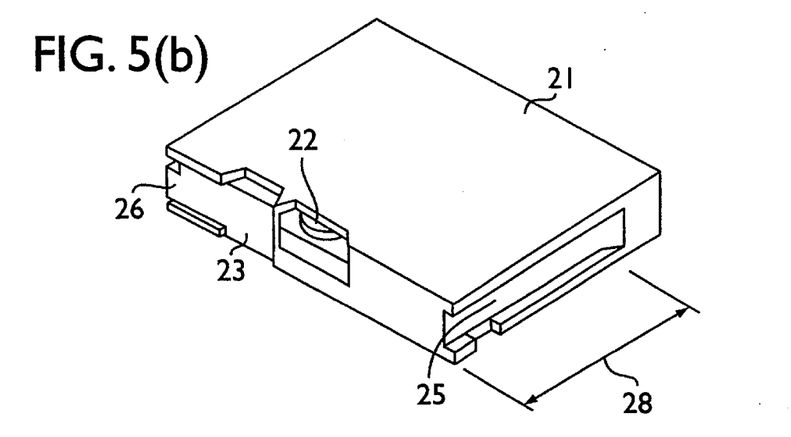
FIG. 5(b) is a perspective view of a conventional tape cartridge.
Figure 5C:
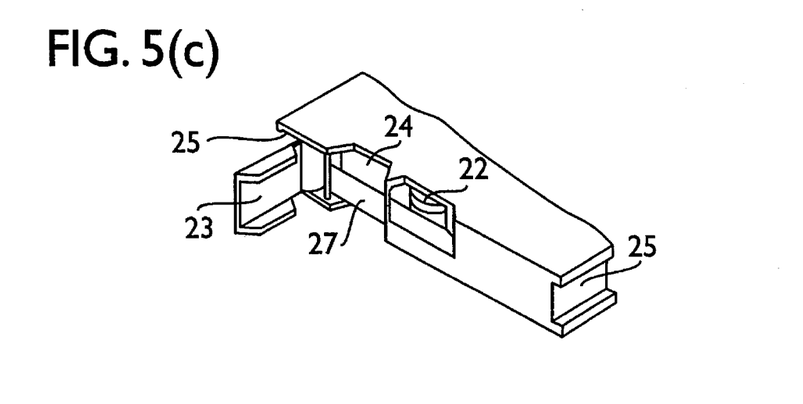
FIG. 5(c) is a perspective view of a portion of a conventional tape cartridge illustrating the opened tape protecting door.

Recently, a tape cartridge 21 such as that illustrated in FIGS. 5(a), 5(b), and 5(c) has been used for recording and playing back data. As shown, this tape cartridge 21 has the following components:

(1) a pair of reels (not shown) around which a magnetic tape 27 is wound;

(2) a driving roller 22 inside the front portion of the tape cartridge 21, which links up with the pair of reels via a driving belt (not shown);

(3) an opening 24 at the front of the tape cartridge, for admitting a magnetic head of the magnetic tape cartridge driver; and (4) a tape protecting door free to open and close, for closing the opening 24 to protect the magnetic tape in modes other than record and playback.

A conventional magnetic tape cartridge drive designed for use with a tape cartridge such as that described above is recited in Japanese Utility Model, Provisional Publication H3-49639.

Figure 6:
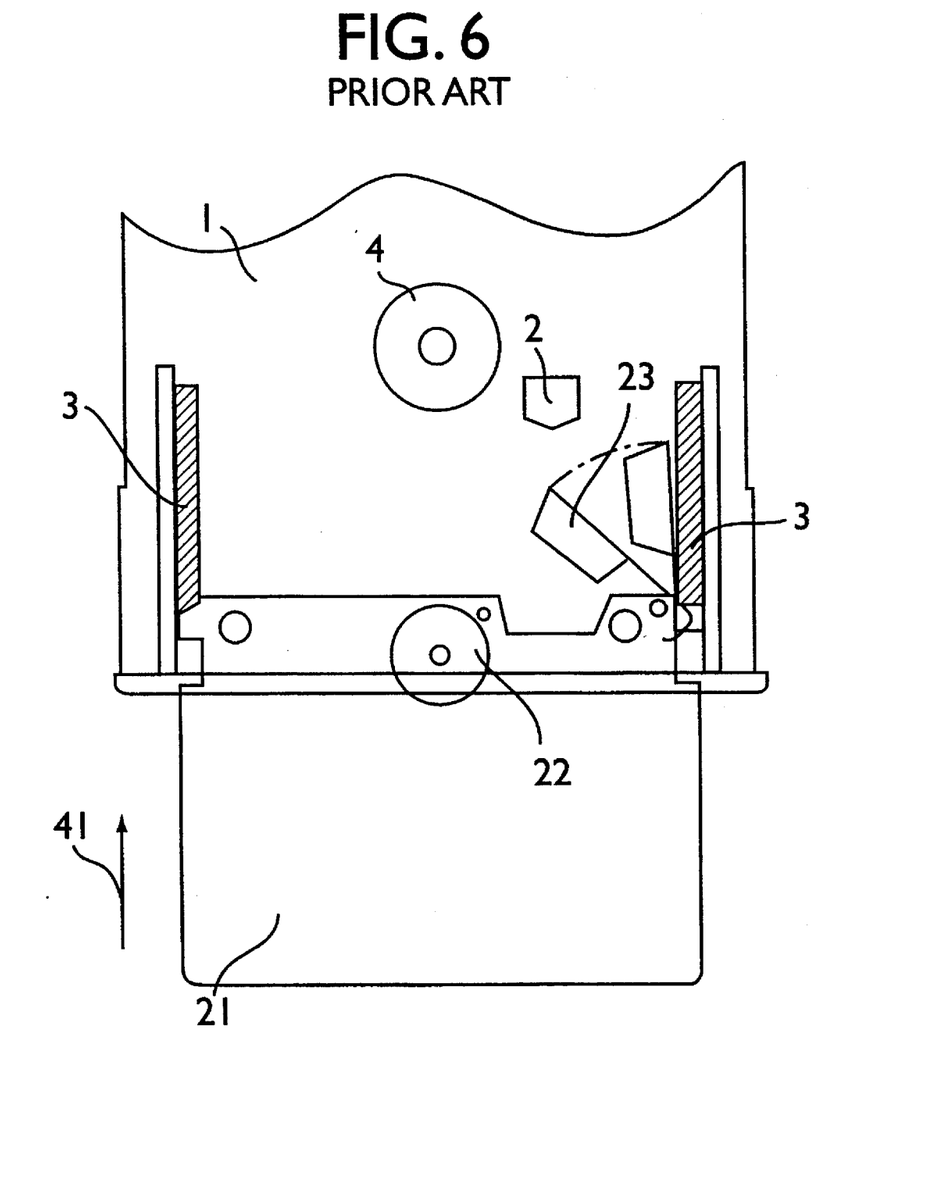
FIG. 6 is a top view of a conventional cartridge magnetic tape driver.

Referring to FIG. 5 and FIG. 6, a tape cartridge 21 is inserted into a tape driving apparatus in the direction indicated by arrow mark 41. When inserting the tape cartridge 21 into a tape driving apparatus, a pair of guide rails 3 disposed in parallel on a chassis mechanism 1 of the driving apparatus engages with a pair of guide grooves 25 formed on both sides in the front portion of the tape cartridge 21, causing an edge 26 of a tape protecting door 23 protruding over the guide groove 25 to engage with the guide rail 3, thereby opening the tape protecting door 23 and exposing a magnetic tape 27.

When the tape cartridge 21 is inserted further into the driving apparatus, the guide grooves 25 disposed on the sides thereof move along the guide rails 3, until the magnetic head 2 mounted in the tape driving apparatus comes into contact with the magnetic tape 27 exposed through the opening 24, which was formed by opening the tape protecting door 23. At the same time, a capstan roller 4 mounted in the tape driving apparatus comes into pressure contact with a driving roller 22 mounted in the tape cartridge 21, thereby rotating the driving roller 22 and driving a reel via a driving belt (not shown) to run the magnetic tape 27, thus recording or playing back data.

While the tape cartridge described above has been widely used, a longer magnetic tape is desired for recording more data. However, to accommodate a longer tape, the tape cartridge must be enlarged, and existing tape cartridge driving apparatuses are not capable of accommodating tape cartridges of varying size. Accordingly, there exists a need for a tape cartridge driver capable of accepting an enlarged tape cartridge, as well as being able to record and playback conventional tape cartridges.

Figure 3A:
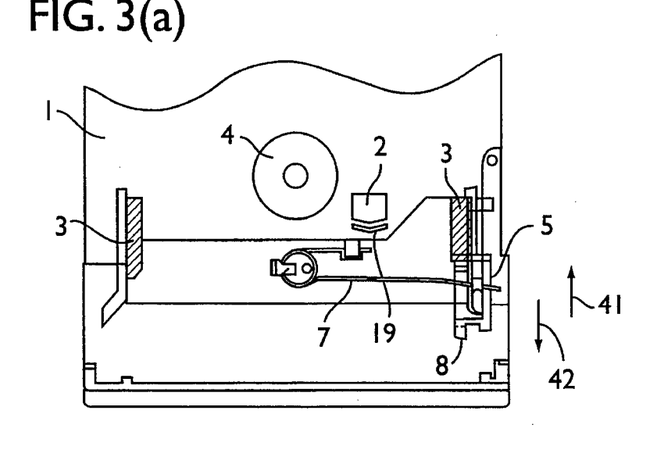
Figure 3B:
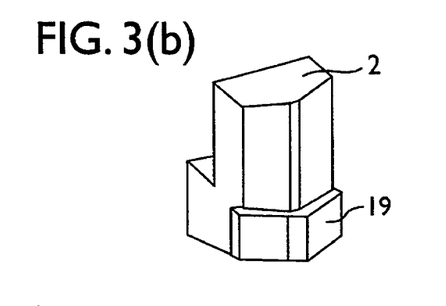
Figure 3C:
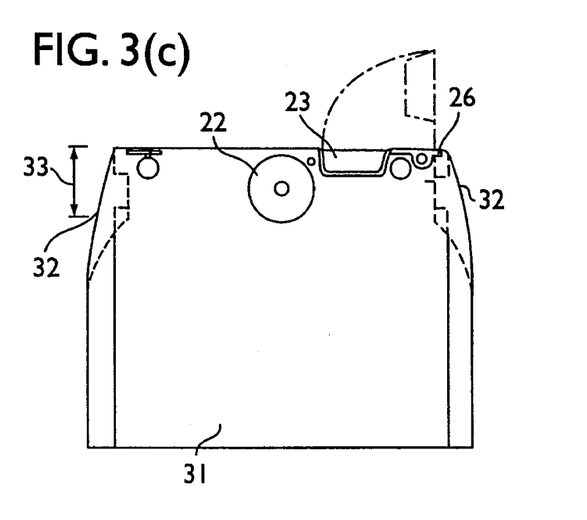
FIG. 3(c) is a top view of a preferred embodiment of an enlarged tape cartridge of the present invention.

To achieve this goal, as shown in FIG. 3(c), the enlarged tape cartridge should have at least the same width and depth on its tape exposing edge as those of the conventional tape cartridge, and also, the location of the driving roller 22 and the tape protecting door 23 should be the same as that of a conventional tape cartridge. Specifically, an enlarged tape cartridge 31 may be as follows: the tape exposing edge and nearby area have the same dimensions as those of a conventional tape cartridge 21, and the other parts are enlarged in width for accepting a longer magnetic tape. A pair of guide grooves 32 of the enlarged tape cartridge has the same distance therebetween as that of the pair of guide grooves 25 of the conventional tape cartridge (see FIG. 5); however, the length of the guide grooves 32 is shorter than that of conventional type in order to accept a longer magnetic tape. Accordingly, a pair of guide rails 3 has a shorter length. In order to enable the enlarged tape cartridge 31 to record/playback, the tape protecting door 23 should be opened while the cartridge moves the shorter distance along the guide rails 3 before the magnetic head 2 comes into contact with the magnetic tape 27 being exposed.

SUMMARY OF THE INVENTION

The present invention provides such a magnetic tape cartridge driver, which enables record and playback functions for an enlarged tape cartridge having greater outer dimensions than a conventional tape cartridge.

In order to achieve this objective, a slider movable in the inserting direction of a cartridge into the tape driver is mounted on a chassis mechanism, and the tip of the slider is positioned such that its tip comes into contact with one of the edges of the protecting door before a guide rail is engaged with a guide groove. The force needed to move the slider is larger than the force needed to open the tape protecting door.

An operation of the above mentioned driver is explained as follows: When inserting an enlarged tape cartridge into the tape cartridge driver of the present invention, a pair of guide rails can be shortened to a position where the guide rails do not interfere with the cartridge, thereby enabling the tip of the slider to open the protecting door at about the same position as that of a conventional driver. The enlarged tape cartridge is then guided by the guide rails to the specified position for being gripped in the driver.

As provided above, the slider allows the tape cartridge driver of the present invention to record/playback not only for use with a conventional tape cartridge, but also with an enlarged tape cartridge having outer dimensions enlarged in order to accept a longer tape wound around a reel.

BRIEF DESCRIPTION OF THE DRAWINGS

FIG. 3 (a) is a top view illustrating an outline of a preferred embodiment.

FIG. 3 (b) is a perspective view of a head and head protecting rib according to a preferred embodiment.

DETAILED DESCRIPTION OF THE INVENTION

A preferred embodiment of the present invention is explained below with reference to the drawings.

Figure 1:
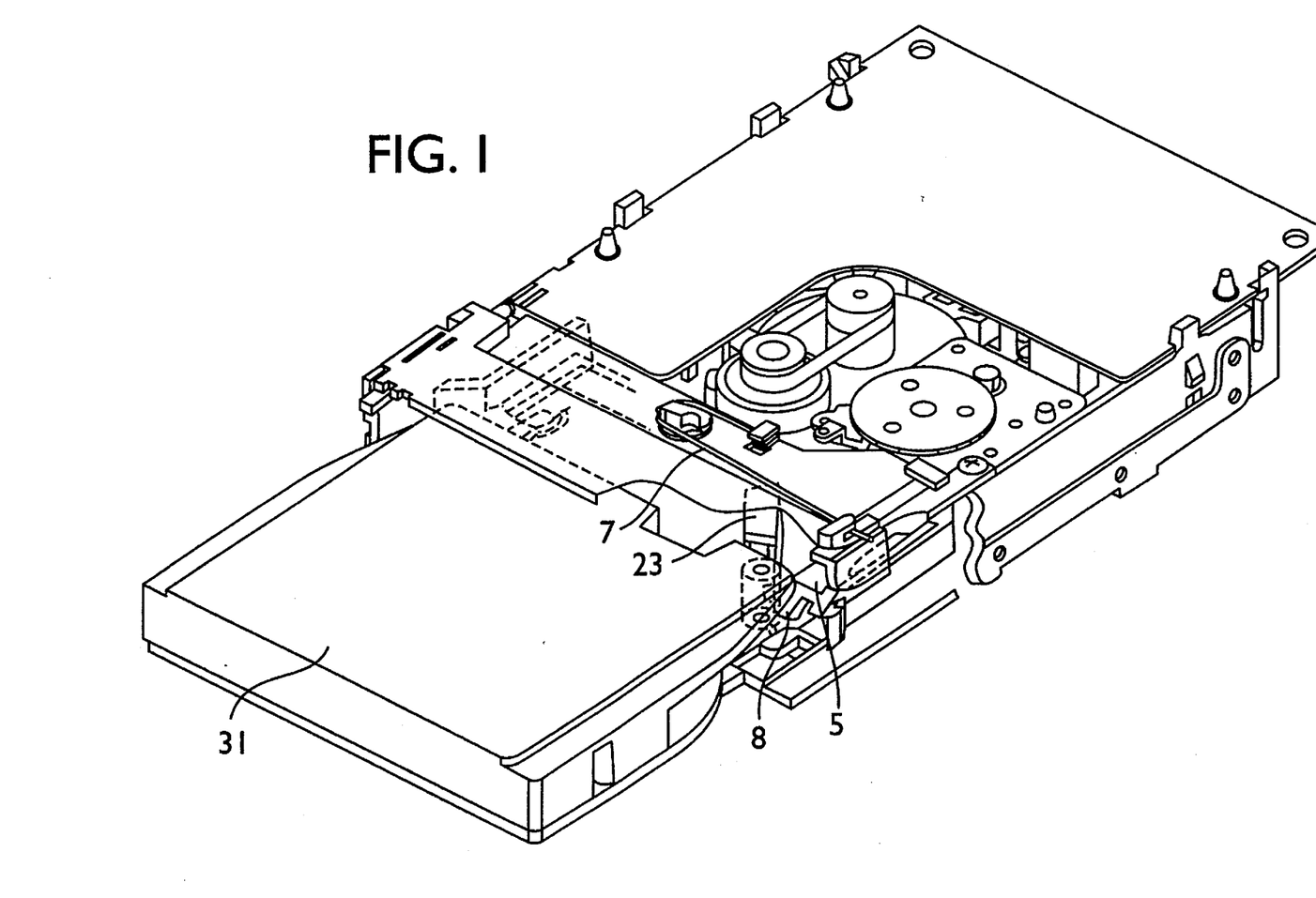
FIG. 1 is a partial cutaway perspective view of the tape cartridge driver according to a preferred embodiment of the present invention.

FIG. 1 is a perspective view illustrating an enlarged tape cartridge being inserted into a cartridge tape driver of the present invention.

Figure 2A:
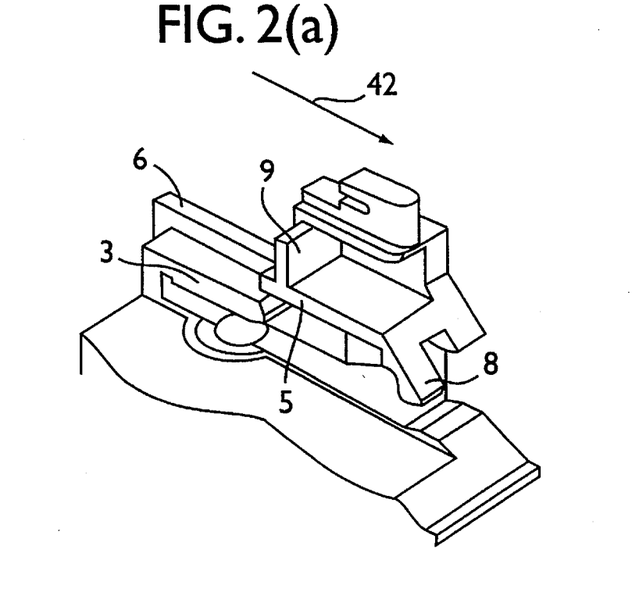
FIG. 2(a) and FIG. 2(b) are perspective views of major parts of a preferred embodiment of the tape cartridge driver of the present invention.
Figure 2B:
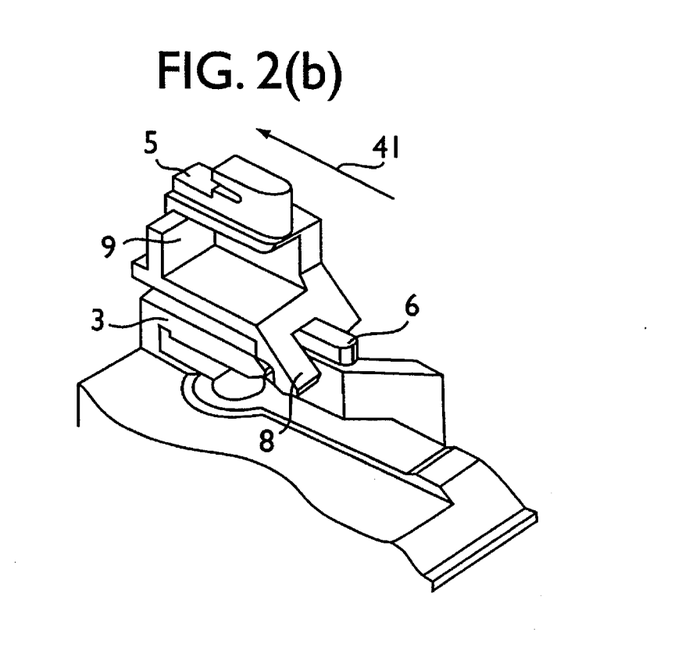

FIG. 2(a) and FIG. 2(b) are perspective views illustrating a structure of a slider, which is a feature of the present invention.

FIG. 3(a) is a top view of the cartridge tape driver of the present invention, FIG. 3(b) is a perspective view of a head and head protecting rib, and FIG. 3(c) is a top view of the enlarged tape cartridge.

In these figures, components that are identical in both the conventional structure, such as that shown in FIGS. 5 and 6, and the inventive structure of the present invention are identified by the same reference numbers.

In the preferred embodiment, a slider 5 is mounted such that it can be moved along a slider rail 6 extending in parallel with a right-hand guide rail 3, and the slider 5 can be moved in such a way that a side of the slider 5 is in contact with the guide rail 3. A tip 8 of the slider 5 is structured to move along an extension-line of the guide rail 3 with the moving of the slider 5. In general, as shown in FIG. 2(a) and FIG. 3(a), the tip 8 is positioned remote from the tip of the guide rail 3 and is elastically pulled in the direction of arrow mark 42 by a torsion spring 7 shown in FIG. 3(a). In the preferred embodiment, the right-hand guide rail 3 is thinner than the left-hand guide rail 3 in order that the thickness of right-hand guide rail 3 together with the side line portion of the slider 5 can be fit into a guide groove 25 of a tape cartridge.

When an enlarged tape cartridge 31 is inserted along an arrow mark 41 shown in FIG. 3(a), the tip 8 of the slider 5 engages with an edge 26 of the tape protecting door 23, shown in FIG. 3(c), thereby opening the tape protecting door 23 before the guide groove 25 of the enlarged tape cartridge 31 engages with the guide rail 3. The force needed to move the slider 5 is designed to be greater than that required for opening the tape protecting door 23 to ensure the opening of the tape protection door 23 during insertion of a tape cartridge.

Further insertion of the enlarged tape cartridge 31 allows an edge of the cartridge to come into contact with a contact face 9 formed on the slider 5 (see FIG. 2(a)), and the slider 5 slides into a position shown in FIG. 2(b) against the elastic force in the direction 42 caused by the torsion spring 7. At this time, the tape cartridge 31 is guided by the overlapped plate portion of the guide rail 3 and slider 5 into a position where the record and playback operations can be conducted, and the tape cartridge 31 is maintained in this position by a tape cartridge holding/releasing mechanism (not shown). A driving roller 22 of the tape cartridge 31 is rotated by a capstan roller 4 driven by a motor (not shown), in the same manner by which a conventional tape cartridge driver operates, and thereby drives the magnetic tape housed in the tape cartridge 31 for the head to record or playback data.

The same process described above is used when inserting a conventional tape cartridge, such as that shown in FIG. 5. First, the tape protecting door 23 of the tape cartridge 21 is opened when pressed by the slider tip 8 of the tape driver. Further insertion of the tape cartridge 21 allows the guide rails 3 disposed on the right and left sides to guide the tape cartridge 21, and the edge of the tape cartridge 21 comes into contact with the contact face 9 of the slider 5, thereby pushing the slider 5 in a direction opposite the elastic force 42 to position the slider 5 at the specified place where the record and playback operations may be performed. The tape cartridge 21 is gripped by the tape cartridge holding/releasing mechanism (not shown) in the same manner as described above with respect to the enlarged tape cartridge.

Figure 4A:
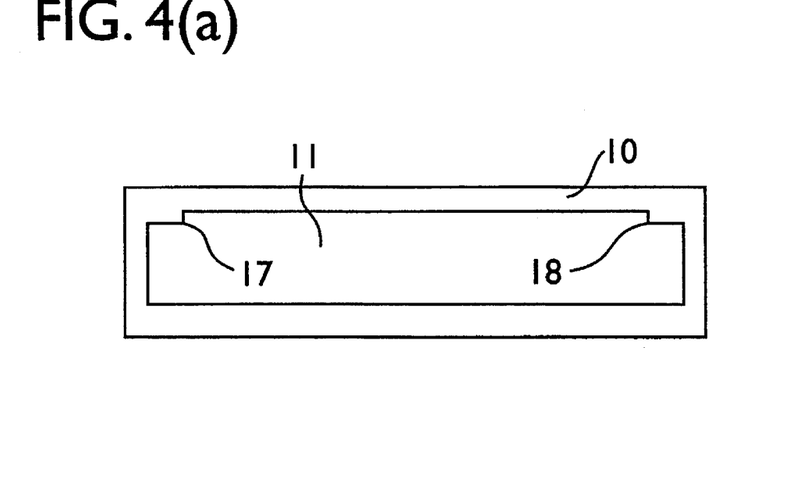
FIG. 4(a) is a front view of a front panel mounted on the tape driver and disposed around the tape cartridge inlet.
Figure 4B:
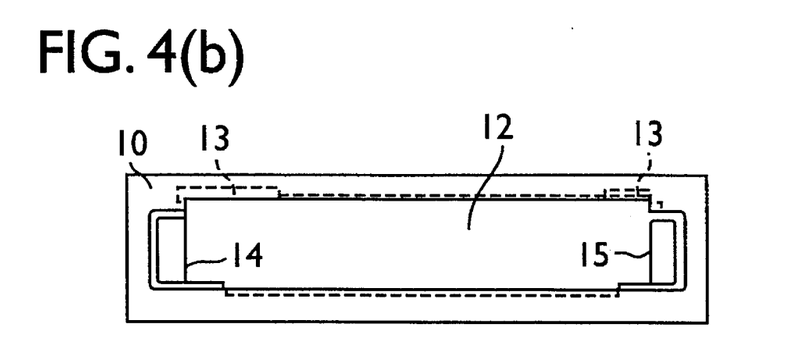
FIG. 4(b) is a front view of the driver on which a door is mounted around the inlet of the tape cartridge.
Figure 4C:
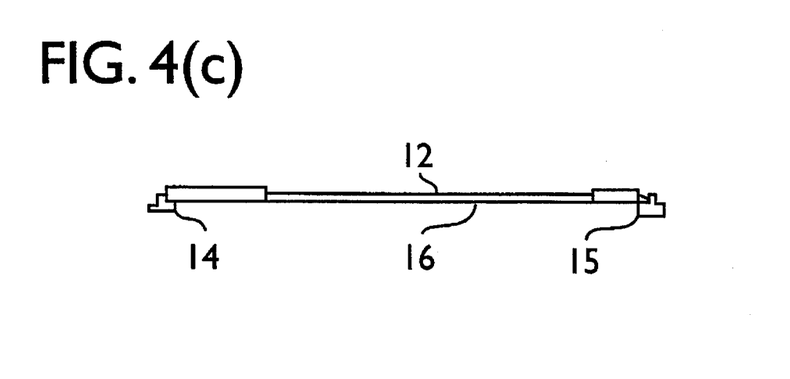
FIG. 4(c) is a top view of the door.

As shown in FIG. 4(a), a cartridge inlet 11 of a front panel 10 mounted on the tape driver has a convex shape. As shown in FIG. 4(b) and FIG. 4(c), a door 12 is provided to the cartridge inlet 11, having a rotation fulcrum 13 on its top edge, and is opened by being pushed inward by the edge of a cartridge being inserted. A left step 14 and a right step 15 are formed on the left and right sides of the door 12, thereby forming a concave pattern on the door center, having approximately the same shape as that of the cartridge edge. Accordingly, the convex pattern 17 on left corner and the convex pattern 18 on right corner of the cartridge inlet 11, and a left step 14 as well as a right step 15 formed on the door 12, guide both the conventional tape cartridge 21 shown in FIG. 5(a) and the enlarged tape cartridge 31 shown in FIG. 3(c) into the tape driver.

When a tape cartridge is inserted abruptly by force, or when the slider 5 moves before the tape protecting door 23 is opened completely, the tape protecting door 23 may hit the magnetic head 2 and may damage it. In order to prevent the magnetic head 2 from being damaged, a head protecting lib 19 is disposed in front of the magnetic head 2 on the mechanism chassis 1, and the head protecting lib 19 is formed into such a shape and dimension as not to interface the contact between the magnetic head 2 and a magnetic tape (not shown) during record and playback modes.

What is claimed is:

1. A magnetic tape cartridge driver having a magnetic head insertable into an opening of a tape cartridge, the opening exposing a magnetic tape housed inside the tape cartridge, wherein the tape cartridge comprises a pair of guide grooves formed on each side for engaging with a pair of guide rails of the magnetic tape cartridge driver during insertion of the tape cartridge, and a tape protecting door for closing the opening to protect the magnetic tape, having an edge protruding over one of the guide grooves, wherein the magnetic tape cartridge driver comprises:

a slider movable along one of the guide rails, a tip of the slider coming into contact with the protruding edge of the tape protecting door before engagement of the guide rail with the guide groove, thereby opening the tape protecting door and enabling contact between the magnetic head and the magnetic tape.

2. The magnetic tape cartridge driver of claim 1, further comprising a head protecting rib disposed in front of said magnetic head, mounted on a chassis mechanism for preventing interference between said tape protecting door and said magnetic head when opening/closing said tape protecting door of said tape cartridge.

3. The magnetic tape cartridge driver of claim i, further comprising:
   an inlet for inserting the tape cartridge; and
   a door attached by at least one rotation fulcrum at a top side of the inlet, having at its center, a concave pattern approximately the same shape as an edge of the tape cartridge, for guiding the tape cartridge during insertion.

* * * * *

UNITED STATES PATENT AND TRADEMARK OFFICE
CERTIFICATE OF CORRECTION

PATENT NO. : 5,606,471
DATED : February 25, 1997
INVENTOR(S) : INOUE et al.

It is certified that error appears in the above-indentified patent and that said Letters Patent is hereby corrected as shown below:

Col. 5, line 1: "claim i" should read --claim 1--

Signed and Sealed this

Twenty-ninth Day of September, 1998

Attest:

BRUCE LEHMAN

*Attesting Officer*    *Commissioner of Patents and Trademarks*